(12) United States Patent
Bell (10) Patent No.: US 7,840,809 B2
(45) Date of Patent: Nov. 23, 2010

(54) METHOD AND SYSTEM FOR SECURE TRANSMISSION OF AN ENCRYPTED MEDIA STREAM ACROSS A NETWORK

(75) Inventor: Robert T. Bell, Bountiful, UT (US)

(73) Assignee: Cisco Technology, Inc., San Jose, CA (US)

( * ) Notice: Subject to any disclaimer, the term of this patent is extended or adjusted under 35 U.S.C. 154(b) by 1056 days.

(21) Appl. No.: 11/361,261

(22) Filed: Feb. 24, 2006

(65) Prior Publication Data

US 2007/0206787 A1    Sep. 6, 2007

(51) Int. Cl.
  *H04L 9/00* (2006.01)
(52) U.S. Cl. .................. 713/171; 380/277; 380/278
(58) Field of Classification Search .............. 705/35; 713/171, 182; 714/5; 380/277, 278
  See application file for complete search history.

(56) References Cited

U.S. PATENT DOCUMENTS 6,233,565 B1 *  5/2001  Lewis et al. .................. 705/35
2001/0023483 A1    9/2001  Kiyomoto
2002/0023208 A1    2/2002  Jancula
2003/0131236 A1 *  7/2003  Sasmazel ..................... 713/171
2004/0181811 A1 *  9/2004  Rakib .......................... 725/122
2004/0236953 A1 * 11/2004  Merenne et al. ............. 713/182
2005/0278565 A1 * 12/2005  Frattura et al. ................ 714/5

OTHER PUBLICATIONS

Author: Deb Shinder; Title: Understanding the Role of the PKI; Date: Oct. 12, 2004; Source: http://www.windowsecurity.com/articles/Understanding_the_Role_of_the_PKI.html.

* cited by examiner

*Primary Examiner*—Kieu Oanh Bui
*Assistant Examiner*—Thong Truong
(74) *Attorney, Agent, or Firm*—Trellis IP Law Group, PC (57) ABSTRACT

Embodiments of the invention provide a method and system for sending a session key file encryption key for use in the secure transmission of an encrypted media stream across a network. A logging node receives a double encrypted session key file encryption key. The session key file encryption key is used to encrypt session keys, which in turn can be used to decrypt the encrypted media stream. The logging node decrypts the session key file encryption key. Thereafter, the logging node sends the session key file encryption key to a reviewing node for use in secure transmission of the encrypted media stream.

15 Claims, 6 Drawing Sheets

METHOD AND SYSTEM FOR SECURE TRANSMISSION OF AN ENCRYPTED MEDIA STREAM ACROSS A NETWORK

BACKGROUND OF THE INVENTION

1. Field of Invention

Embodiments of the invention relate, in general, to electronic communication. More specifically, embodiments of the invention relate to methods and systems for use of encrypted media in electronic communication.

2. Description of the Background Art

In electronic communication, as in many other fields, with the advent of cryptographic protection mechanisms, there has been an increased expectation related to privacy. In addition, there is also an increased intent for security of sensitive information. For example, IP telephony requires close monitoring and safeguarding of session-keying material as well as encrypted communication. However, networks are required to diagnose problems, particularly with voice communication using the pure/unencrypted media streams.

With the advent of encryption, access to these pure/unencrypted media streams is adequately restricted. The media streams are encrypted with session key material, which changes for each communication session.

When a user reports a problem that occurred in a communication session, a technician tries to debug that problem. The user may describe the problem as disturbance, jitter, or bad connection. However, the technician needs to define the problem in terms of loss of packet(s) or echo or anything else. Therefore, on the basis of the description provided by the user, the technician may not be able to diagnose the problem. In this case, the technician needs to listen to the communication to recognize the problem. Therefore, a line-tap is set up to capture these session keys, which can be used to listen to the encrypted media streams. However, in certain situations like military applications, the technician may not have the permission to listen to the complete communication. This is because the information exchanged in the communication is confidential. Therefore, the information must be screened before it is provided to the technician. This information may be transmitted to a reviewer, who will screen it. In this case, the information must be securely transmitted to maintain its confidentiality.

DETAILED DESCRIPTION OF EMBODIMENTS OF THE INVENTION

The embodiments of the invention provide a method and a system for sending a session key file encryption key for use in secure transmission of an encrypted media stream across a network. In the description herein for embodiments of the present invention, numerous specific details have been provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A problem may occur during the communication of a media stream, especially voice communication, in the network. A network includes user nodes and debugging nodes. One or more user nodes can report a problem to a debugging node. To resolve the problem, the debugging node requires access to session keys that are used to decrypt the encrypted media stream. Consequently, the debugging node sends a request to a collecting node for the session keys. The collecting node creates the session key file encryption key for encrypting the session keys. The collecting node collects the session keys corresponding to the communication of the user node, and encrypts them with the session key file encryption key. Thereafter, the encrypted media stream and the encrypted session keys are transmitted to a reviewing node. The session key file encryption key is encrypted with a review public key, which is a public key of the reviewing node. This encrypted session key file encryption key is further encrypted with a log public key, which is a public key of a logging node to obtain a double encrypted session key file encryption key. This double encrypted session key file encryption key is sent to the logging node. The logging node decrypts this double encrypted session key file encryption key with a log private key, which is a private key corresponding to the log public key, to obtain the encrypted session key file encryption key. The logging node maintains this encrypted session key file encryption key in an auditable log, which cannot be changed by the debugging node. Thereafter, the encrypted session key file encryption key is sent to the reviewing node. The reviewing node decrypts the encrypted session key file encryption key with a review private key, which is the private key of the reviewing node corresponding to the review public key. The session key file encryption key is used to decrypt the session keys, which are used to decrypt the media stream. Thereafter, the media stream is screened for sensitive information. Screened media stream that is safe is transmitted to the debugging node for identifying and resolving the problem.

Figure 1:
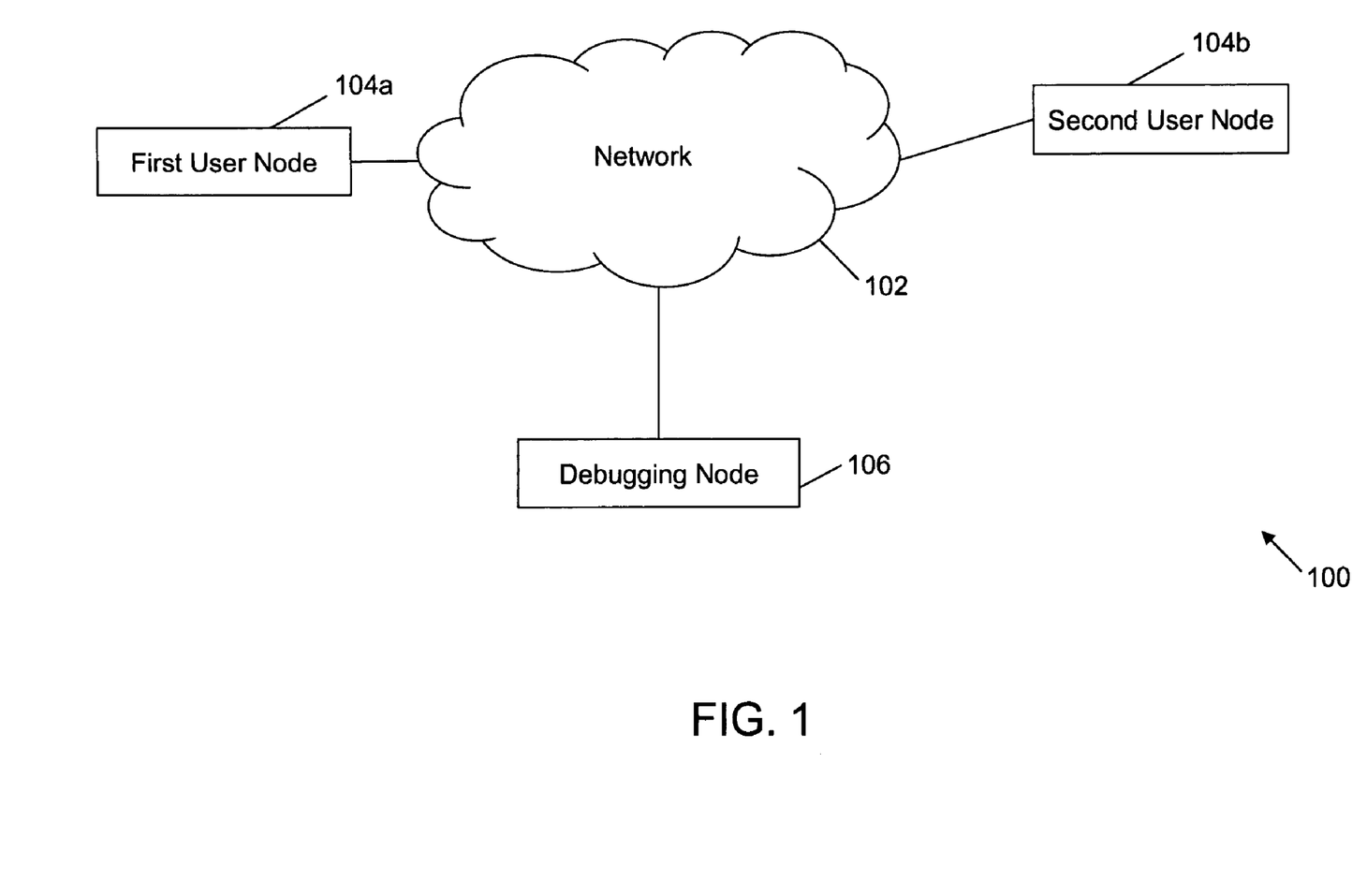
FIG. 1 illustrates an environment for implementing an embodiment of the present invention.

Referring now to the drawings, particularly by their reference numbers, FIG. 1 illustrates an environment 100 for implementing an embodiment of the present invention. The environment 100 includes network 102 and nodes connected to network 102. Examples of network 102 include the Internet, an optical network, a Local Area Network (LAN), a Wide Area Network (WAN), and a wireless network. Examples of the nodes include microprocessors, mobile devices, handheld devices, wireless devices, servers, or any other programmable data-processing device. The nodes may also be telephony end-points, such as those used in Public Switched Telephone Network (PSTN) networks, and Voice over Internet Protocol (VoIP) networks. The nodes communicate over network 102. In an embodiment of the invention, the nodes include user nodes 104 and a debugging node 106. User nodes 104, which include a first user node 104a and a second user node 104b, communicate with each other. If a problem occurs in the communication, first user node 104a and/or second user node 104b report the problem to debugging node 106, which resolves the problem. To diagnose the problem, debugging node 106 requires access to the media stream of the communication. Therefore, it sets up a line trap to collect samples of the media stream, between first user node 104a and second user node 104b. These samples are used to diagnose the problem.

Figure 2:
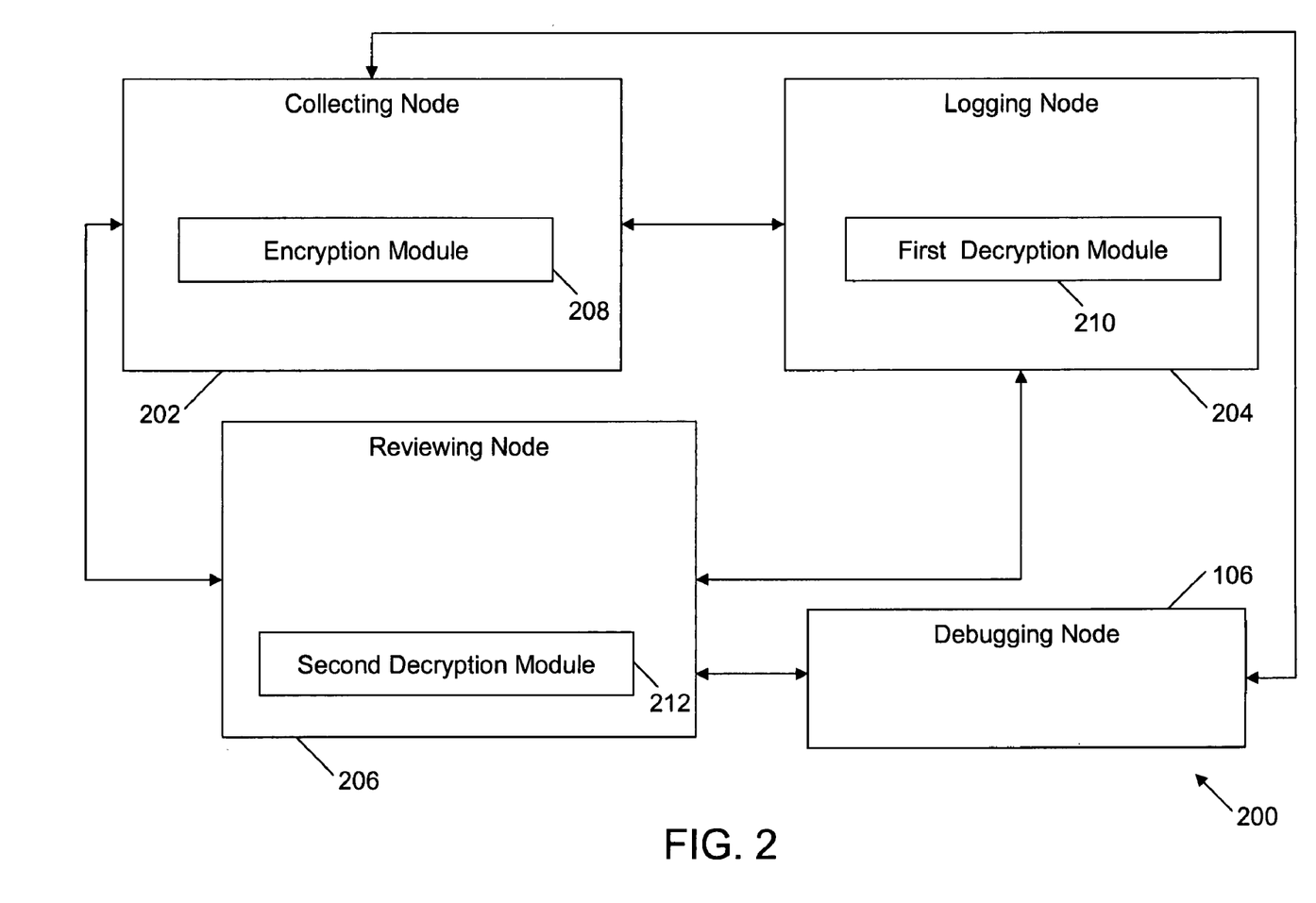
FIG. 2 illustrates a block diagram of a system for sending a Session key file encryption key for use in secure transmission of an encrypted media stream across a network, in accordance with an exemplary embodiment of the present invention.

FIG. 2 illustrates a block diagram of a system 200 for sending a session key file encryption key for use in secure transmission of an encrypted media stream across a network, in accordance with an exemplary embodiment of the present invention. System 200 includes a collecting node 202, a logging node 204, a reviewing node 206 and a debugging node 106. Collecting node 202 is a call control agent that controls calls between first user node 104a and second user node 104b. For example, collecting node may be a call manager product marketed by Cisco Systems. Collecting node 202 collects session keys corresponding to the encrypted media stream. These session keys are used to decrypt the media stream. The session keys vary with each communication session. There can be one or more session keys for a particular communication session. Collecting node 202 comprises an encryption module 208. Encryption module 208 creates the session key file encryption key that is used to encrypt the session keys. The characteristic of the session key file encryption key is that it provides strong encryption. For example, a random 128-bit key can be used as the session key file encryption key. Encryption module 208 is also used to encrypt the session key file encryption key to obtain a double encrypted session key file encryption key.

Logging node 204 comprises a first decryption module 210, which is used to decrypt the double encrypted session key file encryption key.

Reviewing node 206 comprises a second decryption module 212. Second decryption module 212 is used to decrypt the encrypted session key file encryption key, the encrypted session keys and the encrypted media stream. Reviewing node 206 also screens and selects the media stream that does not contain confidential information. The selected media stream is transmitted to debugging node 106.

Figure 3:
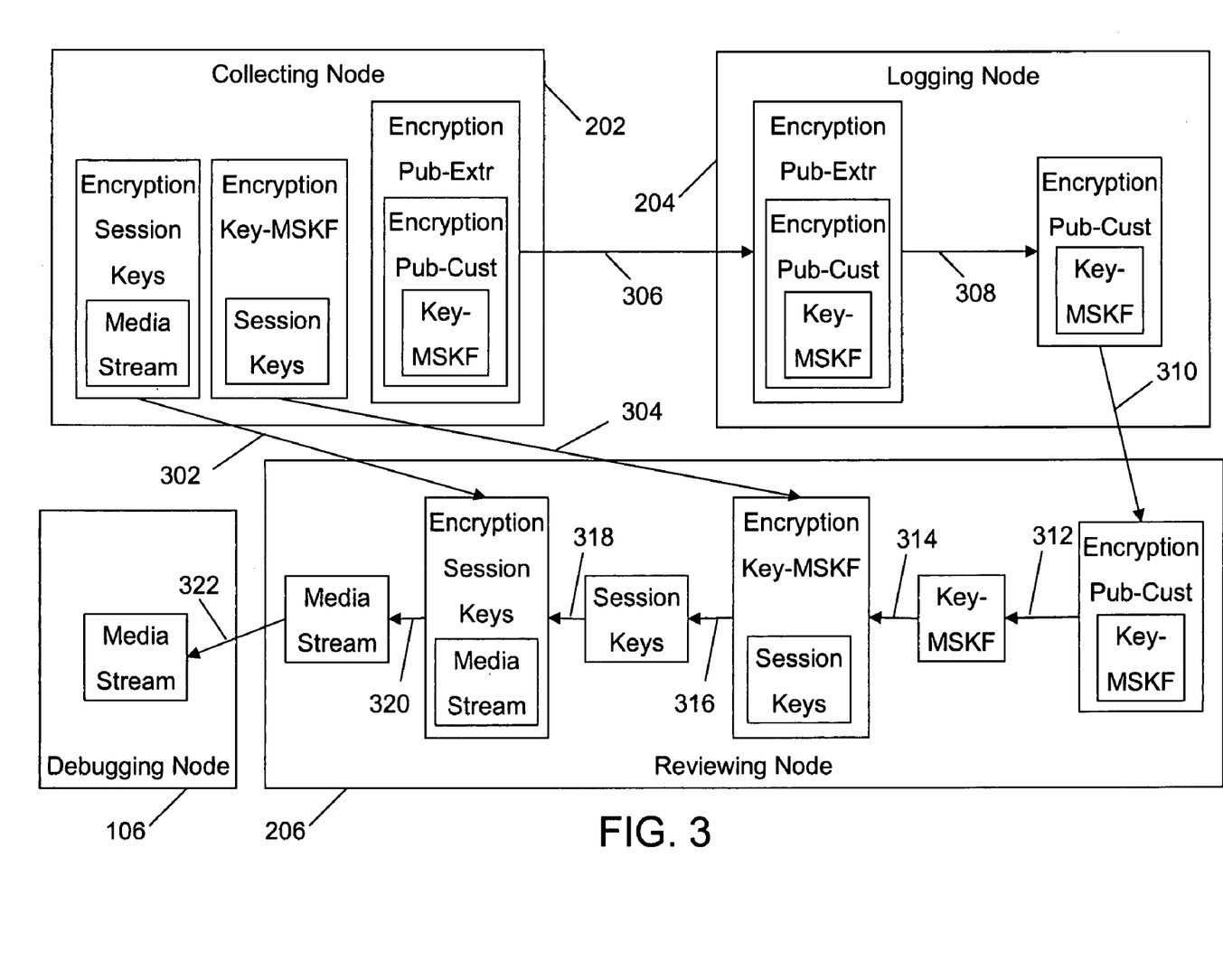
FIG. 3 illustrates the flow of data between the elements of the system for sending a session key file encryption key for use in secure transmission of an encrypted media stream across a network, in accordance with an exemplary embodiment of the present invention.

FIG. 3 illustrates the flow of data between the elements of the system 200 for sending a session key file encryption key for use in secure transmission of an encrypted media stream across a network, in accordance with an exemplary embodiment of the present invention. The encrypted media stream is present in collecting node 202. These are encrypted with the help of the session keys. Thereafter, collecting node 202 encrypts the session keys with the session key file encryption key, which is hereinafter referred to as Key-MSKF. Thereafter, collecting node 202 transmits the encrypted media stream and the encrypted session keys to reviewing node 206, as represented by arrows 302 and 304, respectively. At collecting node 202, Key-MSKF is encrypted with a review public key, which is the public key of reviewing node 206. The review public key is hereinafter referred to as Pub-Cust. Encryption module 208 further encrypts this encrypted Key-MSKF with a log public key, which is a public key of logging node 204. The log public key is hereinafter referred to as Pub-Extr. The double encrypted Key-MSKF, hereinafter referred to as the Authblock, is sent to logging node 204 as represented by arrow 306. At logging node 204, the Authblock is decrypted to obtain the encrypted Key-MSKF, as represented by arrow 308. This is sent to reviewing node 206, as represented by arrow 310. At reviewing node 206, the encrypted Key-MSKF is decrypted to yield the Key-MSKF, as represented by arrow 312. The Key-MSKF is used to decrypt the encrypted session keys, as represented by arrows 314 and 316. The obtained session keys are used to decrypt the encrypted media stream, as represented by arrows 318 and 320. Thereafter, the media stream is selected based on one or more conditions. The selected media stream is transmitted to debugging node 106 as represented by arrow 322.

Figure 4:
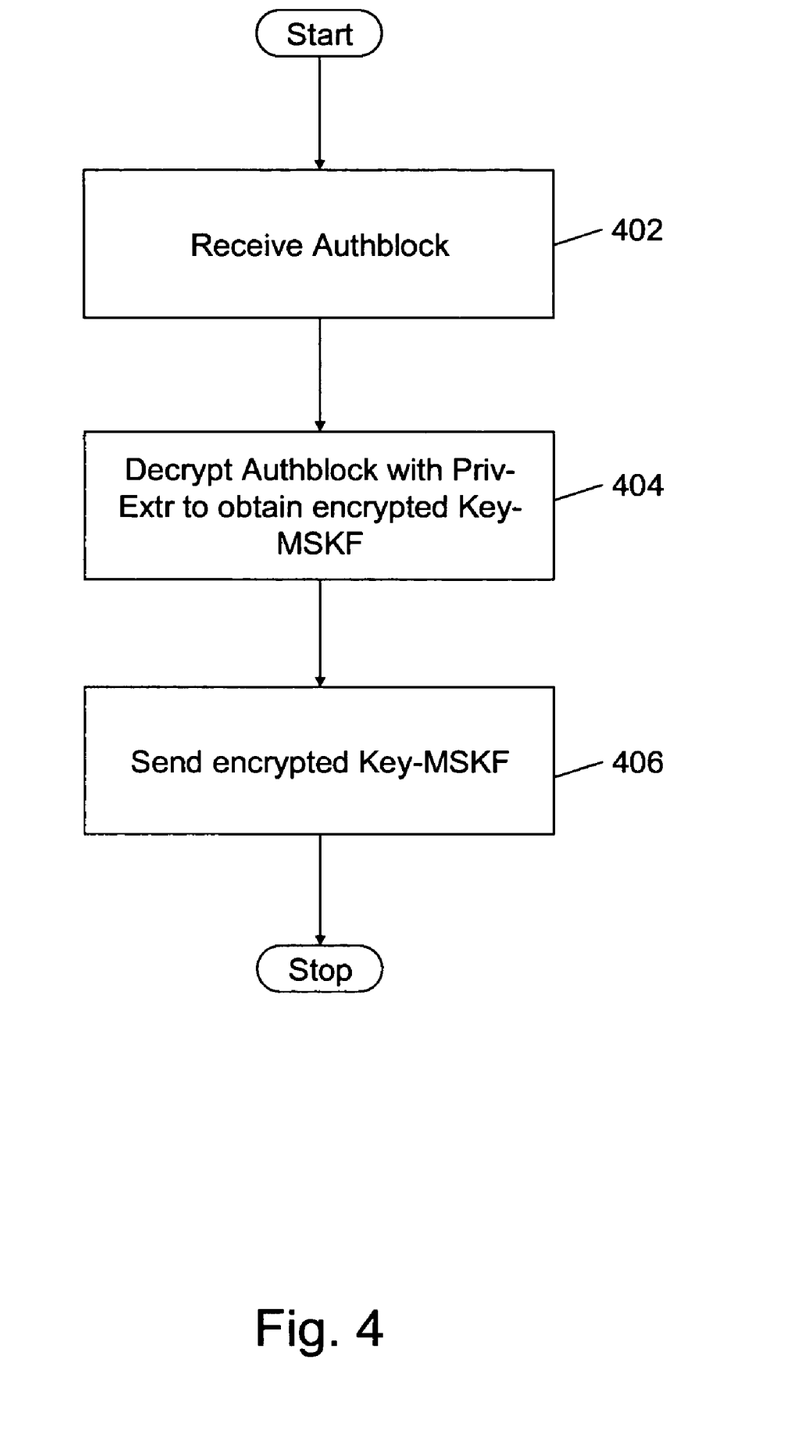
FIG. 4 illustrates a flowchart of a method for sending a session key file encryption key for use in secure transmission of an encrypted media stream across a network, in accordance with an embodiment of the present invention.

FIG. 4 illustrates a flowchart of a method for sending a Key-MSKF for use in secure transmission of an encrypted media stream across a network, in accordance with an embodiment of the present invention. At step 402, logging node 204 receives the Authblock from collecting node 202. As mentioned earlier, the Authblock is obtained by encrypting the Key-MSKF by encryption module 208. The Authblock is encrypted with Pub-Cust and Pub-Extr, which are the public keys of reviewing node 206 and logging node 204, respectively. At step 404, the Authblock is decrypted by first decryption module 210. First decryption module 210 decrypts the Authblock using Priv-Extr, which is the private key of logging node 204. After this decryption, Key-MSKF encrypted with Pub-Cust is obtained. At step 406, the encrypted Key-MSKF is provided to reviewing node 206.

Figure 5:
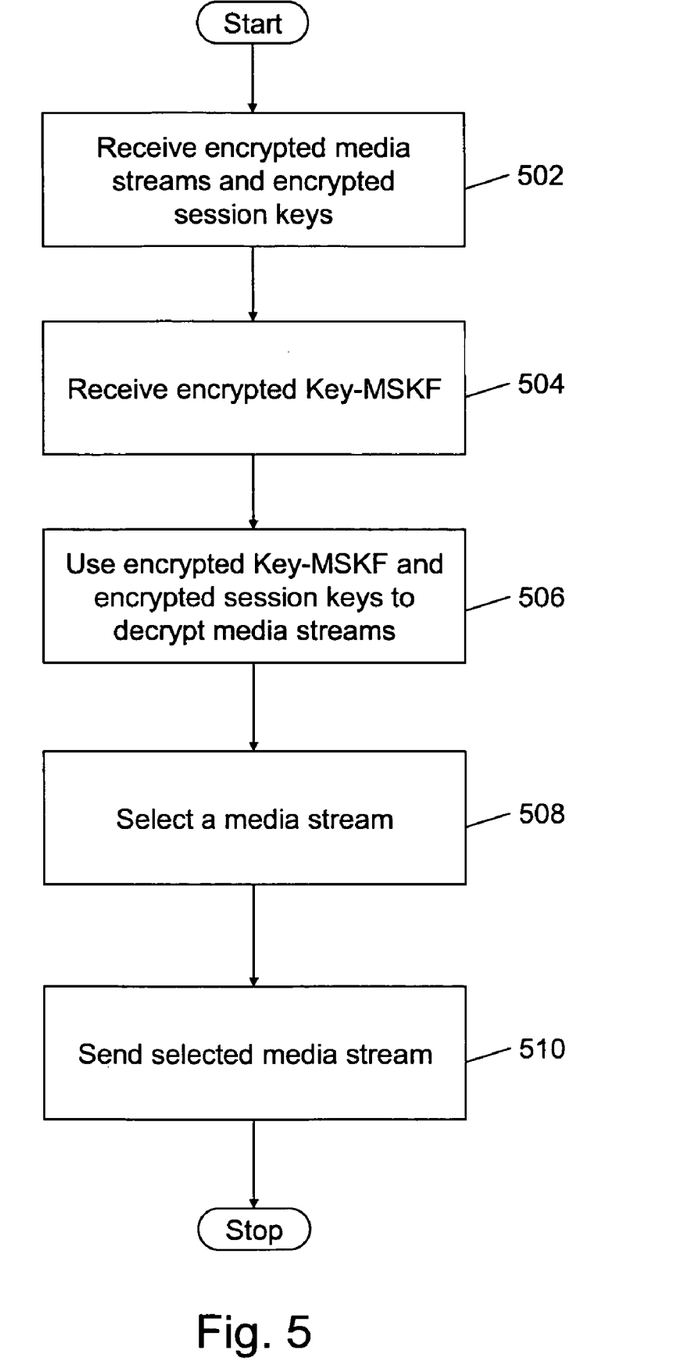
FIG. 5 illustrates a flowchart of a method for sending a session key file encryption key for use in secure transmission of an encrypted media stream across a network, in accordance with another embodiment of the present invention.

FIG. 5 illustrates a flowchart of a method for sending a Key-MSKF for use in secure transmission of an encrypted media stream across a network, in accordance with another embodiment of the present invention. At step 502, the encrypted media stream and encrypted session keys are received by reviewing node 206. The session keys are encrypted with the Key-MSKF, as mentioned earlier. At step 504, reviewing node 206 also receives encrypted Key-MSKF from logging node 204. This encrypted Key-MSKF is encrypted with a Pub-Cust, which is the public key of reviewing node 206. At step 506, second decryption module 212 uses this encrypted Key-MSKF and the encrypted session keys to obtain the media stream. Second decryption module 212 decrypts the encrypted Key-MSKF using a Priv-Extr, which is the private key of reviewing node 206. Second decryption module 212 uses this Key-MSKF to decrypt the encrypted session keys. Thereafter, the session keys are used to decrypt the encrypted media stream. At step 508, reviewing node 206 selects the media stream based on a condition. The condition is that the media stream should not contain any confidential information. At step 510, this selected media stream is transmitted to debugging node 106.

Figure 6:
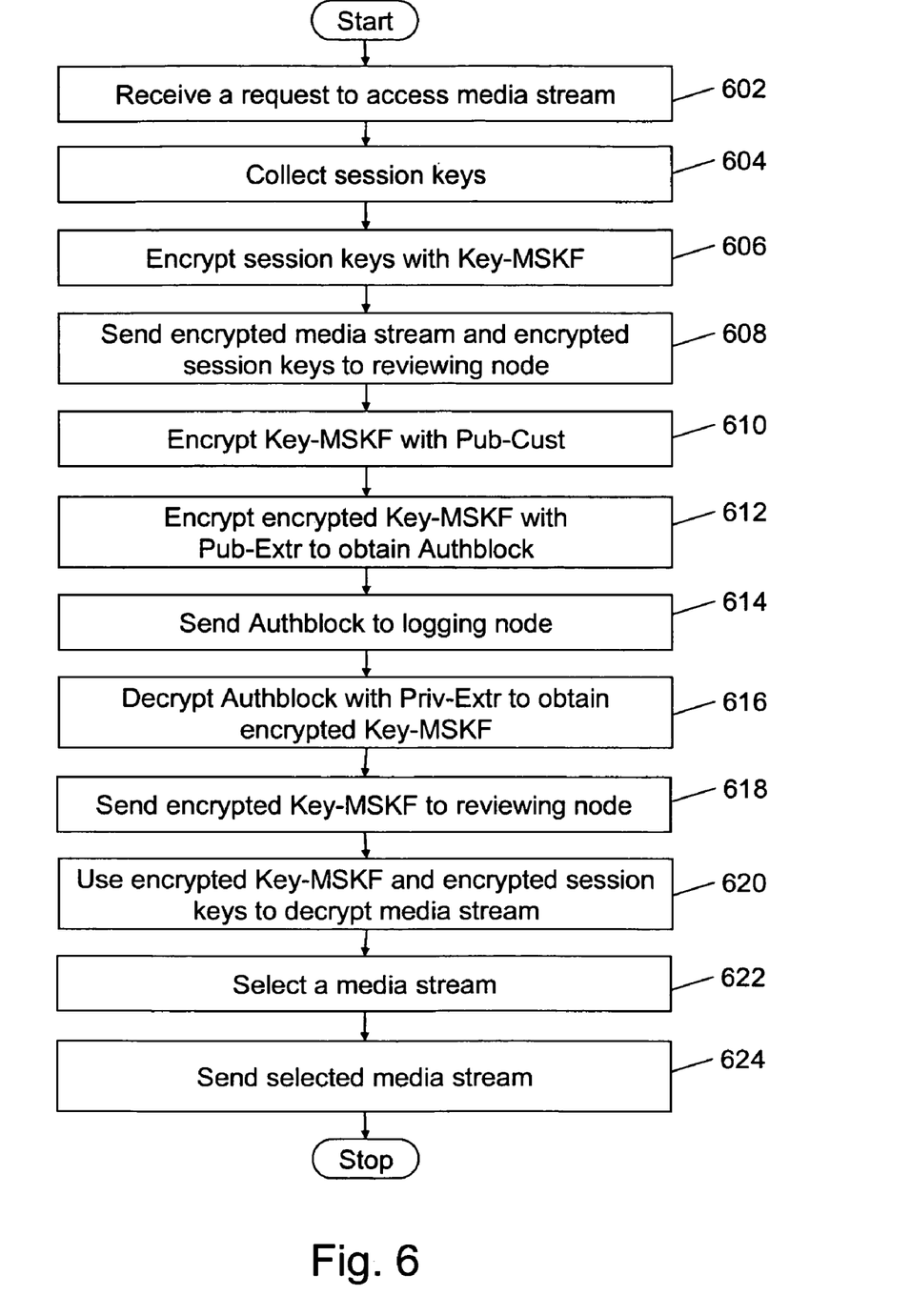
FIG. 6 illustrates a detailed flowchart of a method for sending a session key file encryption key for use in secure transmission of an encrypted media stream across a network, in accordance with yet another embodiment of the present invention.

FIG. 6 illustrates a detailed flowchart of a method for sending a Key-MSKF for use in secure transmission of an encrypted media stream across a network, in accordance with yet another embodiment of the present invention. When a problem is reported to debugging node 106, it requires access to the session keys for the encrypted media stream. Therefore, at step 602, collecting node 202 receives a request from debugging node 106 to access the session keys. At step 604, collecting node 202 collects the session keys for the encrypted media stream. At step 606, encryption module 208 encrypts the session keys with the Key-MSKF. Key-MSKF is generated by encryption module 208 to provide strong encryption to session keys. The encryption can be represented as $$E(\text{Key-MSKF}, \text{Media Session Key File}) \quad (1)$$

where, equation (1) represents encryption of Media Session Key File with Key-MSKF; and Media Session Key File is a file comprising the session keys.

The encryption makes the session keys inaccessible without the access to the Key-MSKF. At step 608, the encrypted session keys and the encrypted media stream are transmitted to reviewing node 206. However, reviewing node 206 cannot use them without access to the Key-MSKF. At step 610, encryption module 208 encrypts the Key-MSKF with Pub-Cust, which is the public key of reviewing node 206 to obtain the encrypted Key-MSKF. This encryption can be represented as $$E(\text{Pub-Cust}, \text{Key-MSKF}) \quad (2)$$

where, equation (2) represents encryption of Key-MSKF with Pub-Cust.

At step 612, the encrypted Key-MSKF is further encrypted with Pub-Extr, which is a public key of logging node 204, to obtain the Authblock. This is represented as:

$$\text{Authblock} = E(\text{Pub-Extr}, E(\text{Pub-Cust}, \text{Key-MSKF})) \quad (3)$$

where, equation (3) represents encryption of E(Pub-Cust, Key-MSKF) with Pub-Extr.

At step 614, Authblock is sent to logging node 204. At step 616, first decryption module 210 decrypts the Authblock with a Priv-Extr to obtain the encrypted Key-MSKF. Priv-Extr is the private key of the logging node 204, corresponding to the Pub-Extr. This is represented as $$D(\text{Priv-Extr}, \text{Authblock}) = E(\text{Pub-Cust}, \text{Key-MSKF}) \quad (4)$$

where, equation (4) represents decryption of Authblock with Priv-Extr to obtain E(Pub-Cust, Key-MSKF).

At step 618, the encrypted Key-MSKF is sent to reviewing node 206. At step 620, second encryption module 208 uses the encrypted Key-MSKF and the encrypted session keys for decrypting the encrypted media stream. Second encryption module 208 decrypts the encrypted Key-MSKF with a Priv-Cust, which is the private key of the reviewing node 206 corresponding to Pub-Cust. This is represented as:

$$D(\text{Priv-Cust}, E(\text{Pub-Cust}, \text{Key-MSKF})) = \text{MSKF} \quad (5)$$

where, equation (5) represents decryption of E(Pub-Cust, Key-MSKF) with Priv-Cust to obtain MSKF.

The Key-MSKF is then used to decrypt the session keys. This is represented as:

$$D(\text{MSKF}, \text{Media Session Key File}) \quad (6)$$

where, equation (6) represents decryption of Media Session Key File with MSKF; and Media Session Key File is a file containing the session keys.

Finally, the session keys are used to decrypt the media stream. At step 622, a media stream is selected from the decrypted media stream based on a condition. The condition is that the selected media stream must not contain any confidential information. At step 624, reviewing node 206 transmits the selected media stream to debugging node 106 for identifying and resolving the problem.

According to another embodiment of the invention, collecting node 202 generates a hash of the session keys. This hash is appended to the encrypted Key-MSKF. Thereafter, the encrypted Key-MSKF, appended with the hash, is encrypted with the Pub-Extr to obtain the Authblock. Therefore, in this embodiment, equation (3) is modified to $$\text{Authblock} = E(\text{Pub-Extr}, E(\text{Pub-Cust}, \text{Key-MSKF}) + \text{Hash}(\text{Media Session Key File})) \quad (7)$$

where, equation (7) represents encryption of E(Pub-Cust, Key-MSKF)+Hash(Media Session Key File) with Pub-Extr; Media Session Key File is a file containing the session keys; and hash(Media Session Key File) represents the hash of Media Session Key File. At logging node 204, this Authblock is decrypted with the Priv-Extr to obtain the encrypted Key-MSKF and the hash of the session keys. Therefore, equation (4) changes to:

$$D(\text{Priv-Extr}, \text{Authblock}) = E(\text{Pub-Cust}, \text{Key-MSKF}) + \text{Hash}(\text{Media Session Key File}) \quad (8)$$

This hash of the session keys is sent to reviewing node 206. Reviewing node 206 compares the session keys received from collecting node 202 with the hash to verify the receipt of the correct session keys, corresponding to the encrypted media stream.

In another embodiment of the invention, the hash is not appended with the encrypted Key-MSKF. Collecting node 202 directly sends the hash to reviewing node 206. As mentioned earlier, reviewing node 206 compares the hash with the received session keys to confirm that the session keys haven't been modified before reaching reviewing node 206.

In another embodiment of the invention, collecting node 202 also provides certain information with the encrypted media stream and the encrypted session keys to reviewing node 206. This information is useful for correlating the encrypted media stream with the session keys so that the correct session keys are used to decrypt the encrypted media stream.

In various embodiments of the invention, logging node maintains an auditable log. This log is used to store information such as the encrypted Key-MSKF, the entity that requested for the session keys, date and time of receiving the request, date and time of receiving the Authblock, date and time of sending the encrypted Key-MSKF, among others. The log is maintained in a manner that debugging node 106 cannot modify it.

In yet another embodiment of the invention, debugging node 106 can access all the session keys. In this case, reviewing node 206 is not required. Second decryption module 212 is present in debugging node 106. In addition, logging node 204 is required before debugging node 106 can access the media stream. The logging, by logging node 204, ensures security of the media stream.

In still another embodiment of the invention, reviewing node 206 encrypts the selected media stream with a public key of debugging node 106. Thereafter, this encrypted media stream is transmitted to debugging node 106. Debugging node 106 uses a private key, corresponding to the public key provided to reviewing node 206, to decrypt the encrypted media stream. This ensures the security of the media stream in transit from reviewing node 206 to debugging node 106.

Various embodiments of the invention provide a method for sending a session key file encryption key for use in secure transmission of an encrypted media stream across a network, the method comprising: receiving a double encrypted session key file encryption key, wherein the session key file encryption key is used to encrypt session keys, wherein the session keys are used to decrypt the encrypted media stream; decrypting the double encrypted session key file encryption key with a log private key to obtain an encrypted session key file encryption key, wherein the log private key is a private key of a logging node; and sending the encrypted session key file encryption key for use in secure transmission of the encrypted media stream.

According to another embodiment of the invention, a method for sending a session key file encryption key for use in secure transmission of an encrypted media stream across a network, the method comprising: receiving the encrypted media stream and encrypted session keys, wherein session keys are used to decrypt the encrypted media stream; receiving encrypted session key file encryption key, wherein the session key file encryption key is used to decrypt the encrypted session keys; using the encrypted session key file encryption key and the encrypted session keys to decrypt the encrypted media stream; selecting a media stream based on a condition; and transmitting the selected media stream.

According to still another embodiment of the invention, a method for sending a session key file encryption key for use in secure transmission of an encrypted media stream across a network, the method comprising: receiving a request to access the encrypted media stream; collecting session keys, wherein the session keys are used to decrypt the encrypted media stream; encrypting the collected session keys with the session key file encryption key; transmitting the encrypted media stream and the encrypted session keys to a reviewing node; encrypting the session key file encryption key with a review public key to obtain an encrypted session key file encryption key, wherein the review public key is a public key of a reviewing node; encrypting the encrypted session key file encryption key with a log public key to obtain a double encrypted session key file encryption key, wherein the log public key is a public key of a logging node; sending the double encrypted session key file encryption key to the logging node; decrypting the double encrypted session key file encryption key with a log private key by the logging node to obtain the encrypted session key file encryption key, wherein the log private key is a private key of the logging node; sending the encrypted session key file encryption key to the reviewing node; decrypting the encrypted media stream by using the encrypted session key file encryption key and the encrypted session keys; selecting a media stream based on a condition; and transmitting the selected media stream to a debugging node.

According to yet another embodiment of the invention, a system for sending a session key file encryption key for use in secure transmission of an encrypted media stream across a network, the system comprising: one or more user nodes adapted for reporting the problem; a collecting node adapted for collecting session keys, the session keys are used to decrypt the encrypted media stream, the collecting node comprising: means for encrypting the session keys with the session key file encryption key; means for encrypting the session key file encryption key with a review public key to obtain the encrypted session key file encryption key; and means for encrypting the encrypted session key file encryption key with a log public key to obtain a double encrypted session key file encryption key; a logging node having the log public key as its public key, the logging node comprising: means for decrypting the double encrypted session key file encryption key with a log private key to obtain the encrypted session key file encryption key, wherein the log private key is a private key of the logging node; a reviewing node adapted for selecting the media stream, the reviewing node having the review public key as its public key, the reviewing node comprising: means for decrypting the encrypted session key file encryption key with a review private key to obtain the session key file encryption key, wherein the review private key is a private key of the reviewing node; means for decrypting the encrypted session key file with the session key file encryption key to obtain the session key file; means for decrypting the encrypted media stream with the session keys; and a debugging node adapted to receive the media stream.

The embodiments of the invention provide a method and a system for secure transfer of the media stream. This is accomplished by disallowing the access of media stream by one node without the cooperation of at least another node. Therefore, a media stream that is forwarded for debugging is pre-approved by an authorized entity. In addition, the debugging node cannot set up a line-tap to access the media stream, thereby increasing the security of the media stream. In addition, as the Key-MSKF is a strong key, the possibility of it being broken by an unauthorized person is reduced. As a log is maintained with the logging node, no node can gain access to the media stream without the information being stored in the log. In addition, the log cannot be tampered since it is maintained in a manner that is inaccessible by nodes.

Although the invention has been discussed with respect to specific embodiments thereof, these embodiments are merely illustrative, and not restrictive, of the invention.

For example, a session key file encryption key can be generated in any suitable manner and need not always be randomly generated. For example, session key file encryption key can be generated from pseudo-random algorithms or can include portions of random, pseudo-random and non-random data. Any suitable format for a session key file encryption key can be used. A session key file encryption key need not be of any specific format and can include or use any suitable encryption, authentication or security data, formats or techniques. The use of the term 'session key file encryption key' is not intended to associate this term or any other term in this application with a specific design standard or external definition.

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the invention.

Reference throughout this specification to "one embodiment", "an embodiment", or "a specific embodiment" means that a particular feature, structure, or characteristic described in connection with the embodiment is included in at least one embodiment of the invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention, described and illustrated herein, are possible in light of the teachings herein and are to be considered as part of the spirit and scope of the present invention.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

Embodiments of the invention may be implemented by using a programmed general purpose digital computer, by using application specific integrated circuits, programmable logic devices, field programmable gate arrays, optical, chemical, biological, quantum or nano-engineered systems, components and mechanisms may be used. In general, the functions of the present invention can be achieved by any means as is known in the art. Distributed, or networked systems, components and circuits can be used. Communication, or transfer, of data may be wired, wireless, or by any other means.

A "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as . . . etc. The routines can operate in . . . environment or as stand-alone routines occupying all, or a substantial part, of the system processing.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

What is claimed is:

1. A method for comprising:
receiving, at a collecting node, a request from a debugging node to access session keys used to decrypt an encrypted media stream;
collecting the session keys for the encrypted media stream;
generating, at the collecting node, a session key file encryption key;
encrypting the collected session keys with the session key file encryption key, wherein the session key file encryption key provides strong encryption for the session keys;
transmitting the encrypted media stream and the encrypted session keys to a reviewing node;
encrypting the session key file encryption key with a review public key to obtain an encrypted session key file encryption key, wherein the review public key is a public key of a reviewing node, and wherein the reviewing node uses the review public key to access the session key file encryption key;
encrypting the encrypted session key file encryption key with a log public key to obtain a double encrypted session key file encryption key, wherein the log public key is a public key of a logging node;
sending the double encrypted session key file encryption key to the logging node;
decrypting the double encrypted session key file encryption key with a log private key by the logging node to obtain the encrypted session key file encryption key, wherein the log private key is a private key of the logging node;
sending the encrypted session key file encryption key to the reviewing node;
decrypting the encrypted media stream by using the encrypted session key file encryption key and the encrypted session keys;
selecting a media stream based on a condition, wherein the condition is that the media stream does not contain confidential information; and
transmitting the selected media stream to the debugging node.

2. The method according to claim 1, wherein the receiving further comprises:
generating a hash of the session keys; and
sending the hash to the reviewing node.

3. The method according to claim 2, wherein the sending the hash to the reviewing node comprises comparing the hash with the encrypted session keys by the reviewing node to verify that the encrypted session keys are correct.

4. The method according to claim 1, further comprising:
generating a hash of the session keys;
appending the hash to the encrypted session key file encryption key; and
encrypting the appended encrypted session key file encryption key with the log public key to generate the double encrypted session key file encryption key.

5. The method according to claim 4, further comprising:
decrypting the double encrypted session key file encryption key to generate the encrypted session key file encryption key and the hash; and
sending the encrypted session key file encryption key and the hash to a reviewing node.

6. The method according to claim 1, wherein the decrypting the double encrypted session key file encryption key further comprises maintaining the encrypted session key file encryption key in a log file.

7. The method according to claim 1, wherein the sending the encrypted session key file encryption key further comprises:
receiving the encrypted media stream and the encrypted session keys;
receiving the encrypted session key file encryption key; and
using the encrypted session key file encryption key and the encrypted session keys to decrypt the encrypted media stream.

8. The method according to claim 1, wherein the sending the encrypted session key file encryption key further comprises:
receiving the encrypted media stream and the encrypted session keys;
receiving the encrypted session key file encryption key;
using the encrypted session key file encryption key and the encrypted session keys to decrypt the encrypted media stream;
selecting a media stream based on a condition; and
transmitting the selected media stream.

9. The method according to claim 8, wherein the condition includes absence of confidential information in the media stream.

10. The method according to claim 8, further comprising:
decrypting the encrypted session key file encryption key with a review private key, wherein the review private key is the private key of the reviewing node;
decrypting the encrypted session key file with the session key file encryption key; and
decrypting the encrypted media stream with the session keys.

11. A system comprising:
a collecting node adapted for collecting session keys, the session keys for decrypting the encrypted media stream, the collecting node comprising:
means for receiving a request from a debugging node to access session keys used to decrypt an encrypted media stream;
means for generating a session key file encryption key;
means for encrypting the session keys with the session key file encryption key wherein the session key file encryption key provides strong encryption for the session keys;
means for encrypting the session key file encryption key with a review public key to obtain the encrypted session key file encryption key; and
means for encrypting the encrypted session key file encryption key with a log public key to obtain a double encrypted session key file encryption key;
a logging node having the log public key as its public key, the logging node comprising:
means for decrypting the double encrypted session key file encryption key with a log private key to obtain the encrypted session key file encryption key, wherein the log private key is a private key of the logging node;
a reviewing node adapted for selecting the media stream, the reviewing node having the review public key as its public key, the reviewing node comprising:
means for decrypting the encrypted session key file encryption key with a review private key to obtain the session key file encryption key, wherein the review private key is a private key of the reviewing node;
means for decrypting the encrypted session key file with the session key file encryption key to obtain the session key file;
means for decrypting the encrypted media stream with the session keys;
means for selecting a media stream based on a condition, wherein the condition is that the media stream does not contain confidential information; and
means for transmitting the selected media stream to the debugging node.

12. The system according to claim 11, wherein the collecting node further comprises means for generating a hash of the session keys.

13. The system according to claim 12, wherein the collecting node further comprises means for appending the generated hash to the encrypted session key file encryption key.

14. The system according to claim 12, wherein the reviewing node further comprises means for comparing the hash with the encrypted session keys.

15. The system according to claim 11, wherein the logging node further comprises means for maintaining the encrypted session key file encryption key in a log file.

* * * * *